US011865830B2

(12) United States Patent
Schwab

(10) Patent No.: US 11,865,830 B2
(45) Date of Patent: Jan. 9, 2024

(54) METHOD OF OPERATING A FLEXOGRAPHIC PRINTING PRESS, FLEXOGRAPHIC PRINTING PRESS, SYSTEM AND SLEEVE

(71) Applicant: Heidelberger Druckmaschinen AG, Heidelberg (DE)

(72) Inventor: Werner Schwab, Bechtsrieth (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 17/507,896

(22) Filed: Oct. 22, 2021

(65) Prior Publication Data

US 2022/0126562 A1 Apr. 28, 2022

(30) Foreign Application Priority Data

Oct. 22, 2020 (DE) ......................... 102020213327.1

(51) Int. Cl.

*B41F 5/24* (2006.01)
*B41F 13/14* (2006.01)
*B41F 13/24* (2006.01)
*B41F 33/00* (2006.01)

(52) U.S. Cl.

CPC ................ *B41F 5/24* (2013.01); *B41F 13/14* (2013.01); *B41F 13/24* (2013.01); *B41F 33/0081* (2013.01)

(58) Field of Classification Search

CPC .. B41F 5/24; B41F 13/12; B41F 13/14; B41F 13/24; B41F 33/0081; B41P 2213/90; B41P 2233/13
See application file for complete search history.

(56) References Cited

U.S. PATENT DOCUMENTS 4,553,478 A 11/1985 Greiner et al.
4,860,650 A 8/1989 Houser
8,534,194 B2 9/2013 Whitelaw et al.
(Continued)

FOREIGN PATENT DOCUMENTS

CN 105938422 A 9/2016
DE 3302798 A1 8/1984
(Continued)

*Primary Examiner* — Matthew G Marini
*Assistant Examiner* — Leo T Hinze
(74) *Attorney, Agent, or Firm* — Laurence A. Greenberg; Werner H. Stemer; Ralph E. Locher

(57) ABSTRACT

A method of operating flexographic printing presses having an impression cylinder, printing cylinder carrying a sleeve with a flexographic printing forme or cylinder, uses a sensor adjusting print register of the printing forme or cylinder relative to a further printing forme or cylinder and/or adjusts color density and/or implements color inspection. An image of the sleeve surface with printing forme is recorded by a camera and processed before printing, locating a register mark and/or a color measurement field in terms of x-y positions. A sensor automatically moves for recording the register mark to the y-position of the register mark before adjusting to record the register mark and/or a sensor moves for recording the color measurement field to the y-position of the color measurement field before adjusting to record the color measurement field. Cost-efficient, high-quality industrial printing and further automation is provided.

4 Claims, 9 Drawing Sheets

(56) References Cited

U.S. PATENT DOCUMENTS

| | | | | |
|---|---|---|---|---|
| 2005/0194087 | A1 | 9/2005 | Rossini et al. | |
| 2010/0011978 | A1 | 1/2010 | Whitelaw et al. | |
| 2015/0231876 | A1* | 8/2015 | Kasper | B41F 27/005 101/481 |
| 2017/0165956 | A1 | 6/2017 | Becker | |
| 2020/0353742 | A1 | 11/2020 | Schwab | |

FOREIGN PATENT DOCUMENTS

| | | | |
|---|---|---|---|
| DE | 102006060464 | A1 | 7/2008 |
| DE | 202007004717 | U1 | 9/2008 |
| DE | 102014215648 | A1 | 2/2016 |
| DE | 102020111341 | A1 | 11/2020 |
| EP | 2100732 | A1 | 9/2009 |
| EP | 3053742 | A1 | 8/2016 |
| EP | 3251850 | A1 | 12/2017 |
| EP | 3738773 | A1 | 11/2020 |
| JP | 2007276473 | A | 10/2007 |
| WO | 2008049510 | A1 | 5/2008 |
| WO | 2010146040 | A1 | 12/2010 |

* cited by examiner

METHOD OF OPERATING A FLEXOGRAPHIC PRINTING PRESS, FLEXOGRAPHIC PRINTING PRESS, SYSTEM AND SLEEVE

CROSS-REFERENCE TO RELATED APPLICATION

This application claims the priority, under 35 U.S.C. § 119, of German Patent Application DE 10 2020 213 327.1, filed Oct. 22, 2020; the prior application is herewith incorporated by reference in its entirety.

FIELD AND BACKGROUND OF THE INVENTION

The present invention relates to a method of operating a flexographic printing press including a printing cylinder carrying a sleeve with at least one flexographic printing forme or a flexographic printing cylinder, an impression cylinder, and a sensor for adjusting the print register of the flexographic printing forme or of the flexographic printing cylinder relative to a further flexographic printing forme or relative to a further flexographic printing cylinder and/or for adjusting color density and/or for implementing a color inspection process.

The present invention also relates to a flexographic printing press operated according to the method for printing on a printing substrate using flexographic printing ink and including at least one flexographic printing unit having a printing cylinder carrying a sleeve with at least one flexographic printing forme or a flexographic printing cylinder, an impression cylinder, and an anilox roller.

The invention further relates to a system including a flexographic printing press of the invention and a measuring device for recording an image of a sleeve.

The invention additionally relates to a sleeve for use in a method of the invention or for use in a flexographic printing press of the invention or for use in a system of the invention, the sleeve being marked with a machine-readable ID.

The technical field of the invention is the field of the graphic industry, in particular the field of operating a flexographic printing press, i.e. a rotary printing press which uses flexographic printing formes to print. In particular, the technical field of the invention is the field of adjusting, in particular controlling, potentially in a closed-loop, the machine in terms of color register and/or color density and/or color inspection.

A requirement in so-called flexographic printing, in particular industrial, web-fed flexographic printing, is to print in a cost-efficient way at high speeds with as little waste as possible while maintaining a high quality and using different flexographic printing formes for every print job.

In that context, changing print jobs with different printing formes and different prints may cause problems: the images to be printed may include areas where a lot is printed and areas where only a little is printed as well as areas where nothing or hardly anything is printed.

Before the printing operation, flexographic printing plates may be measured, for instance in a measuring station. German Patent Application DE 10 2019 206 705 A1, corresponding to U.S. patent application Ser. No. 16/871,456, discloses a device for measuring elevations on the surface of a rotary body and provides an improvement which in particular provides a way of quickly measuring elevations of rotary bodies such as flexographic print dots on a flexographic printing plate with a great degree of accuracy. The disclosed device for measuring elevations on the surface of a rotary bodied embodied as a cylinder, roller, sleeve, or plate of a printing press, e.g. a flexographic printing plate mounted to a sleeve, has a first motor for rotating the rotary body about an axis of rotation and a measuring device and is distinguished in that the measuring device includes a radiation source and at least one area scan camera for taking contact-free measurements.

Further documents: German Patent Application DE 33 02 798 A1, corresponding to U.S. Pat. No. 4,553,478; German Patent Application DE 10 2014 215 648 A1; European Patent Application EP 3 251 850 A1; German Patent Application DE 10 2006 060 464 A1, corresponding to U.S. Pat. No. 8,534,194; International Publication WO2010/146040 A1; and International Publication WO2008/049510 A1, which are cited and described in the aforementioned document, and the "smartGPS®" system manufactured by the Bobst Company and described therein are also part of the prior art, as is the "ARun" system of the Allstein Company. Both systems use follower rollers.

A so-called "flying job change" between one job and the next should be completed in only a few seconds. In such a case, register marks on flexographic printing formes of the first print job and on flexographic printing formes of the next print job may be at different positions (both in the axial and circumferential directions). That means that register sensors need to be repositioned. Manual repositioning is disadvantageous: since they take a lot of time and are inaccurate/prone to errors.

Follower rollers do not seem to be suitable for detecting automated register marks, in particular on high-resolution flexographic printing formes with very fine elevations. In addition, such elevations risk being damaged by a follower roller.

SUMMARY OF THE INVENTION

It is accordingly an object of the invention to provide a method of operating a flexographic printing press, a flexographic printing press, a system and a sleeve, which overcome the hereinafore-mentioned disadvantages of the heretofore-known methods, printing presses, systems and sleeves of this general type and which provide an improvement over the prior art, in particular by providing a cost-efficient way of producing high-quality prints in an industrial flexographic printing operation.

Solution in Accordance with the Invention

With the foregoing and other objects in view there is provided, in accordance with the invention, a method of operating a flexographic printing press, the flexographic printing press having an impression cylinder, a flexographic printing cylinder or a printing cylinder carrying a sleeve with at least one flexographic printing forme, and a sensor used to adjust the print register of the flexographic printing formes relative to one another and/or to adjust color density and/or to implement a color inspection process, which includes the steps of recording an image of the surface of the sleeve with the at least one flexographic printing forme by using a camera and subjecting the image to image processing before the printing operation to locate at least one register mark and/or at least one color measurement field in terms of their x-y positions; moving a sensor for recording the register mark to the y-position of the register mark in an automated way before the adjustment to detect the register mark and/or moving a sensor for detecting the color measurement field to the y-position of the color measurement field in an automated way before the adjustment to detect the color measurement field; recording at least one image of the surface of multiple sleeves with multiple flexographic printing formes by using at least one camera before the printing operation to configure a register controller of the flexographic printing press, subjecting the image to digital image processing to locate at least two register marks in terms of their x-y positions, and using the x-y positional data of the register marks to automate the configuration of the register controller for recording register marks.

In an alternative phrasing of the method of the invention, the method of operating a flexographic printing press with at least two printing cylinders, each one of which carries a sleeve with at least one flexographic printing forme, wherein the print register of the flexographic printing formes relative to one another is adjusted and wherein a sensor is used to record register marks, is distinguished in that before the printing operation, a respective image of the surfaces of the sleeves is recorded by using a camera and the respective image is subjected to digital image processing, wherein a total of at least two register marks are located in terms of their x-y positions, the sensor is moved to the y-position of the register marks before the adjustment in an automated way to record the register mark, and the x-y positional data of the register marks are used to automate the configuration of the register controller for recording register marks.

In accordance with the invention, a flexographic printing press includes at least one flexographic printing unit having a flexographic printing cylinder or a printing cylinder carrying a sleeve with at least one flexographic printing forme, an impression cylinder, and an anilox roller, the flexographic printing press is operated in accordance with any one of the methods described above to print on a printing substrate using flexographic printing ink, and the flexographic printing press includes at least one actuating motor for adjusting the y-position of the sensor.

In accordance with the invention, a system formed of a flexographic printing press of the invention and a measuring device for recording an image of a sleeve is distinguished in that the measuring device records the image of the sleeve by using a camera.

A flexographic printing forme or a sleeve for a flexographic printing forme for use in a method or in a flexographic printing press or in a system, with the flexographic printing forme or sleeve being marked width a machine-readable ID, is distinguished in that the machine-readable ID is read out by a machine and saved on a computer to be accessed.

Advantageous Embodiments and Effects of the Invention

The invention advantageously provides a cost-efficient way of producing high-quality prints in an industrial flexographic printing process. In addition, the method of the invention advantageously provides further automation of the printing process.

The invention is described in the context of flexographic printing presses and flexographic printing formes (relief printing). Alternatively, the invention may be used for engraved printing formes or engraved sleeves (gravure). Thus in the context of the present invention, “gravure” or “flexographic or gravure” may be used as alternatives to “flexographic.” Instead of “sleeve with a flexographic printing forme,” the expression “sleeve with an engraved forme” or “engraved sleeve” or “laser-engraved sleeve” or “endless laser-engraved sleeve” or “endless printing forme” or “endless printing sleeve” may be used.

Further Developments of the Invention

The following paragraphs describe preferred further developments of the invention (in short: further developments).

A respective further development of the method of the invention may be distinguished in that:

- the image is measured in a contact-free way.
- the x-direction is the circumferential direction of the sleeve and the y-direction is the direction perpendicular thereto of the sleeve, i.e. the axial direction of the sleeve.
- the process of locating in terms of x-y positions indicates allocating an x-coordinate and a y-coordinate.
- the x-direction is given as a Cartesian coordinate along the circumference or as an angle coordinate.
- the sleeve is assigned a point of origin.
- the image includes the entire circumferential length and working width of the sleeve.
- the register mark is recorded at the x-position when the cylinder rotates.
- the color measurement field is recorded at the x-position when the cylinder rotates.
- the image processing step includes a step of computational pattern detection.
- the computational pattern detection includes searching for a defined pattern of a register mark.
- the defined pattern is a double wedge or a circle with a defined diameter.
- the computational pattern detection includes searching for a defined pattern of a color measurement field.
- the defined pattern is a rectangle with a defined length and a defined width.
- empty spaces next to the register mark or to the color measurement field are recorded and factored in in the computational pattern recognition.
- the register mark and/or the color measurement field is/are part of a control strip.
- in the image processing step, the control strip is located in terms of its x-y position.
- the flexographic printing press includes a flexographic printing unit and at least one further flexographic printing unit, the flexographic printing unit including the printing cylinder and the impression cylinder and the further flexographic printing unit including a further printing cylinder and a further impression cylinder, the further printing cylinder carrying a sleeve with at least one further flexographic printing forme.
- the printing unit includes the sensor for detecting the register mark and the further printing unit includes a further sensor for detecting the register mark.
- the printing unit includes the sensor for detecting the color measurement field and the further printing unit includes a further sensor for detecting the color measurement field.
- the respective sensors for detecting the register mark are embodied as cameras.
- the respective sensors for detecting the color measurement field is embodied as a densitometer.
- an edge in the print image of the flexographic printing forme is detected as the register mark.
- the outer surfaces of the printing cylinder and of the further printing cylinder include a respective journal at a respective journal position in the x-direction.

the inner surfaces of the sleeve and of the further sleeve include a respective groove for the respective journal in the y-direction.

the sleeve and the further sleeve are moved in the y-direction against a stop of the printing cylinder and of the further printing cylinder, respectively.

the stops are positioned in the y-direction.

the sleeve and the further sleeve are marked with respective machine-readable IDs.

the ID is an unambiguous identifier of the sleeve.

the identifier includes multiple symbols, in particular digits and/or letters and/or special characters.

the ID is marked as a one-dimensional code, in particular a bar code, or as a two-dimensional code, in particular a QR code, or as a RFID chip or NFC chip.

the x-coordinates and the y-coordinates of both sleeves or data derived therefrom are forwarded directly to the flexographic printing press together with the respective IDs of the sleeves.

the x-coordinates and the y-coordinates of both sleeves or data derived therefrom are indirectly forwarded to the flexographic printing press together with the respective IDs of the sleeves in that the x-coordinates and the y-coordinates of both sleeves or data derived therefrom together with the respective IDs of the sleeves are buffered and accessed by the flexographic printing press for a printing operation utilizing the sleeves.

the buffering is done on a central memory or a cloud memory.

the adjustment is made after a print job change.

the print register adjustment includes controlling the print register, potentially in a closed control loop.

the controlling of the register of multiple printing cylinders succeeding one another in the direction of web transport in the flexographic printing press, i.e. the printing cylinders including the printing cylinder, the further printing cylinder, and further printing cylinders with further sleeves and further flexographic printing formes, is done relative to the printing cylinder which is the first one to print in the direction of web transport of the printing cylinders.

adjusting color density includes controlling color density, potentially in a closed control loop.

the register mark, the color measurement field, or a further mark is embodied as an error mark for detecting a mounting error of a flexographic printing forme or of multiple flexographic printing formes on the sleeve or on multiple sleeves.

the error marks of at least two flexographic printing formes for printing different print colors are printed on top of one another and detected by a sensor.

a further mark is embodied as an error mark for detecting an x-y positioning error of a sleeve on a flexographic printing cylinder.

an x-y position of the error mark is detected by a sensor and computationally compared to the x-y position of the register mark to computationally determine an x-y positioning error.

the error mark has been/is glued to the sleeve.

each one of the sleeve and the further sleeve includes two sleeves, i.e. an inner adaptation sleeve and an outer printing sleeve, the printing sleeve being thinner than the adaptation sleeve.

the image of the surface of the sleeve with the at least one flexographic printing forme is recorded by the camera before the printing operation.

the image of the surface of the sleeve with the at least one flexographic printing forme is measured by the camera in a measuring device before the printing operation.

the measuring device includes a receptor cylinder for receiving the sleeve with the flexographic printing forme, the receptor cylinder rotates about an axis of rotation—which has an axial direction—during the measurement.

the measuring device is operated outside the flexographic printing press.

the image is recorded by using a camera.

the image is recorded by using an area scan camera.

the image is recorded by using a line scan camera.

the image is recorded by using at least one CIS sensor.

the image is recorded by using at least one stationary camera.

the camera is moved in a direction perpendicular to the axial direction before the measuring operation.

the camera is moved in an axial direction during the measuring operation.

a radiation source, in particular a light source, is used in the measuring operation carried out by the camera.

an entire image of a flexographic printing forme is recorded in the recording operation.

at least one or at least two flexographic printing forme(s) is/are mounted to a sleeve and recorded in the recording operation.

in the recording operation, light from a light source gets to elevations of the flexographic printing forme and from there to the camera.

at least one mirror is used in the recording operation.

the mirror is disposed to be movable.

before the measuring operation, the mirror is moved in a direction perpendicular to the axial direction.

during the measuring operation, the mirror is moved in an axial direction.

in the recording operation, light from a light source gets to elevations of the flexographic printing unit and from there back to the camera through the mirror.

to configure the register controller in a case in which multiple register marks are located on a sleeve in terms of their x-y positions, one of these register marks is computationally selected based on the recorded data. In this process, it is advantageously possible to select a register mark whose y-position substantially corresponds to the y-position(s) of one or more register marks on other sleeves. This may avoid the use of a register mark which is not provided for this specific purpose in the process of configuring the register controller, for instance a register mark for the die-cutting register rather than the printing register.

using the obtained data to computationally determine which register mark of the register mark configuration is printed in which printing unit to configure the register controller of the flexographic printing press.

the register controller is configured as a function of a print-job-dependent order of the printing inks in the printing press, preferably factoring in only those printing units/inks which print for the print job.

A respective further development of the flexographic printing press of the invention may be distinguished in that:

when the flexographic printing press is in operation, it prints on cardboard.

when the flexographic printing press is in operation, paper, cardboard, paperboard, foil, or a composite material is printed on.

- the sleeve carries at least two flexographic printing formes with the same or different images to be printed.
- the two flexographic printing formes are mounted to the sleeve so as to follow one another in the circumferential direction or so as to follow one another in the axial direction.

A respective further development of the system of the invention may be distinguished in that:

- The measuring device is part of a measuring station which is separate from the flexographic printing press.
- the sleeve is marked with a machine-readable ID.
- the ID is an unambiguous identifier of the sleeve.
- the identifier includes multiple symbols, in particular digits and/or letters and/or special characters.
- the ID is marked as a one-dimensional code, in particular a bar code, or as a two-dimensional code, in particular a QR code, or as a RFID chip or NFC chip.
- the system includes a plurality of anilox rollers of different screens and/or screen rulings and/or screen angles and that in a printing operation with a flexographic printing forme, the flexographic printing press is operated with an anilox roller that is computationally selected from a plurality of anilox rollers on the basis of the dot density of the flexographic printing forme or of data derived therefrom.
- that the selected screen roller has a screen that is finer than the screen of the flexographic printing forme.

A respective further development of the flexographic printing forme of the invention or sleeve of the invention for a flexographic printing forme may be distinguished in that:

- the mark with the machine-readable ID is made using a marking device, in particular a marking device which is different from an RFID tag.

Any desired combination of the features and combinations of features disclosed in the above sections regarding the technical field, the invention, and further developments, as well as in the section below regarding exemplary embodiments, likewise represent advantageous further developments of the invention.

Other features which are considered as characteristic for the invention are set forth in the appended claims.

Although the invention is illustrated and described herein as embodied in a method of operating a flexographic printing press, a flexographic printing press, a system and a sleeve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In the figures, corresponding features have the same reference symbols. Repetitive reference symbols have sometimes been left out for reasons of clarity.

Figure 1:
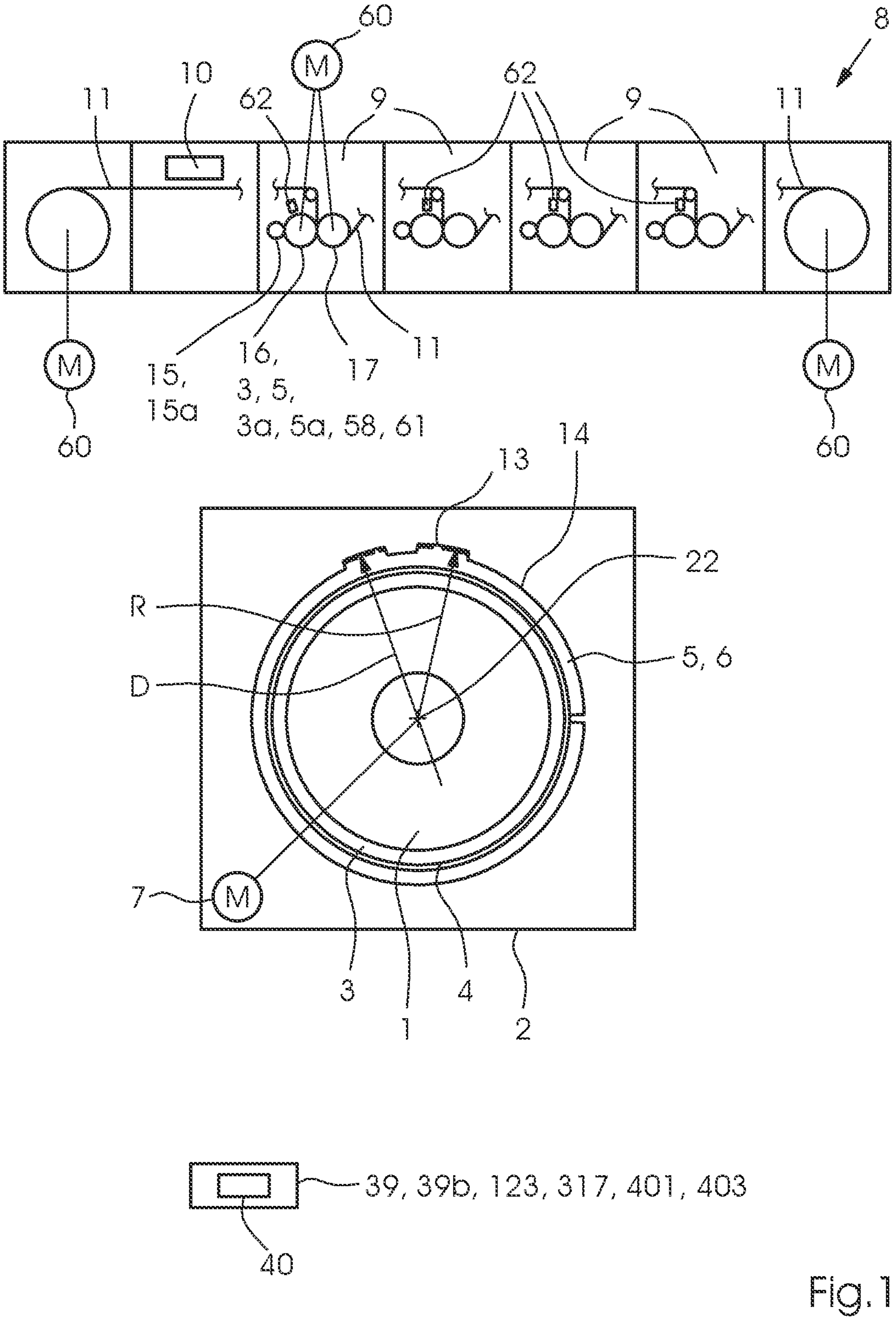
FIGS. 1, 2*a*, 2*b*, 2*c*, 3*a*, 3*b*, 4*a*, 4*b* and 5 are diagrammatic, elevational views illustrating a flexographic printing press, a measuring station including a measuring device (in different embodiments) and a measuring process.

Referring now to the figures of the drawings in detail and first, particularly, to FIG. 1 thereof, there is seen a cross section of a rotatable carrier cylinder 1 of a measuring station 2, a sleeve 3 received on the carrier cylinder, and a printing plate 5 (flexographic printing forme) as a rotary body 6. The printing plate 5 is received on the sleeve 3, preferably fixed to the sleeve by using adhesive tape 4 (or, alternatively, by using an adhesive coating on the sleeve), which process is referred to as "mounting," and its topography is to be measured.

A motor 7 may be provided in the measuring station to rotate the carrier cylinder during the measuring operation. The measuring station may be a part of a so-called "mounter" (in which printing plates are mounted to carrier sleeves) or it may be separate from a "mounter." The measuring station may be separate from a printing press 8 (flexographic printing press) which includes at least one printing unit 9 (flexographic printing unit) for the printing plate 5 and at least one dryer 10 for printing on and drying a printing substrate 11, preferably a web-shaped printing substrate. The printing plate is preferably a flexographic printing forme with a diameter of between 106 mm and 340 mm. The dryer is preferably a hot-air dryer and/or a UV dryer and/or an electron beam dryer and/or an IR dryer. The sleeve may be pushed onto the carrier cylinder from the side. Openings for emitting compressed air to widen the sleeve and to create an air cushion when the sleeve is slid on may be provided in the circumferential surface of the carrier cylinder. The sleeve with the printing plate may be removed from the measuring device after the measuring operation to be slid onto a printing cylinder of the printing unit in the printing press. A hydraulic mounting system may be used as an alternative to the pneumatic mounting system.

In addition, FIG. 1 illustrates a digital computer and/or a digital memory 39, 39*b*, 123, 317, 401 and/or 403. The measuring device may produce data and transmit it to the computer/memory. The data may be measured values obtained by measuring the sleeve 3 and/or the flexographic printing forme(s) 5 or data derived therefrom. The computer/memory may be a part of the measuring device 2 or a part of the flexographic printing press 8; it may also be separate, for instance a central computer/memory (for instance in a print shop) or a cloud-based computer/memory. The computer/memory may transmit data to the flexographic printing press, for instance the measured values or the data derived therefrom or data further derived therefrom. The further derived data may be generated by an algorithm implemented on a computer and/or by an AI (artificial intelligence; a software or hardware-based self-learning and machine-learning system). The computer/memory may receive data from multiple measuring stations and transmit data to multiple flexographic printing presses. The system formed of flexographic printing press(es), measuring station(s), and computer/memory provides a high degree of automation in the printing process even as far as autonomous printing; error-prone inputs and/or modifications of data made by an operator may advantageously be avoided.

The measuring station 2 may be calibrated with the aid of measuring rings 12 provided on the carrier cylinder 1. Alternatively, a measuring sleeve or the carrier cylinder itself may be used for calibration purposes.

Figure 2A:
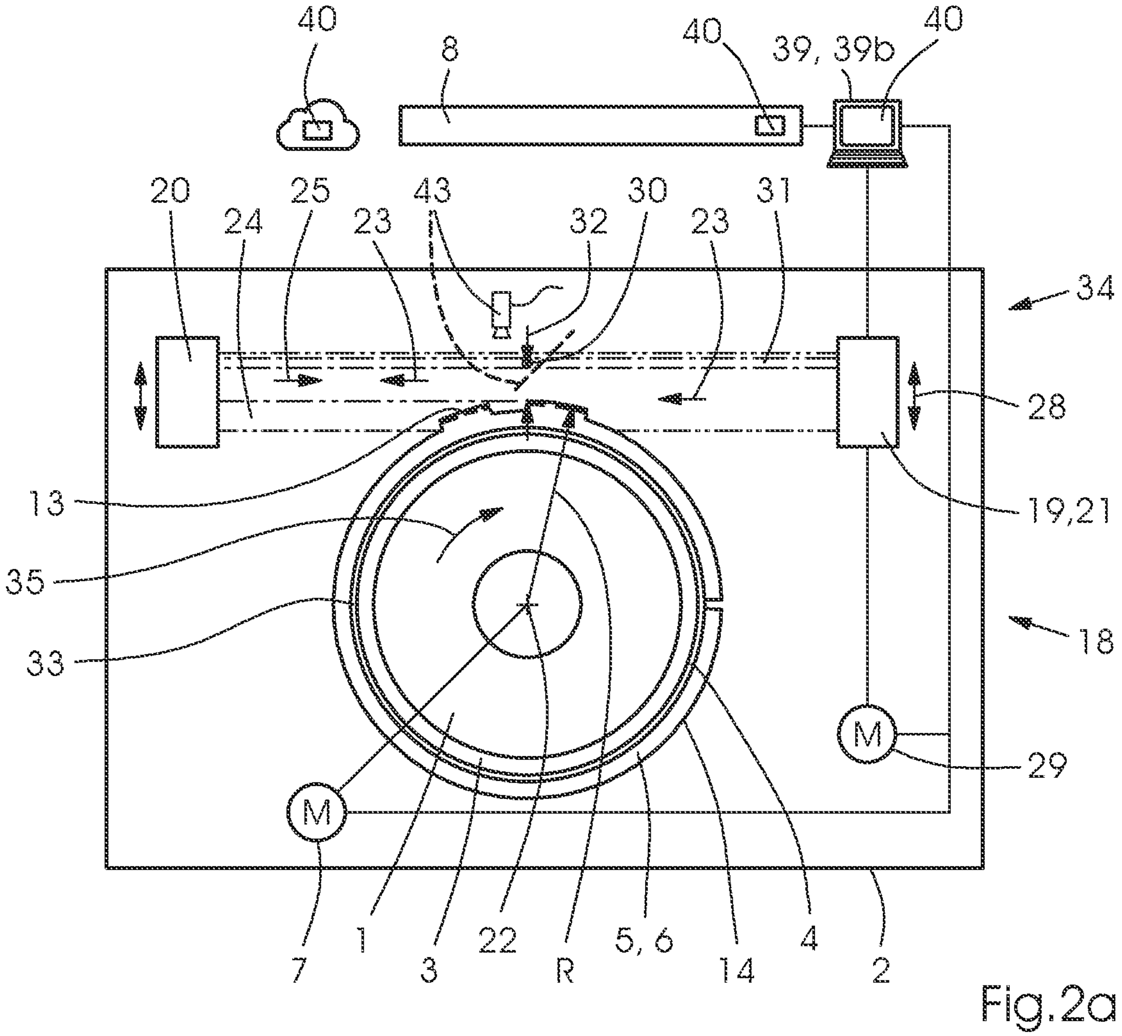
Figure 2C:
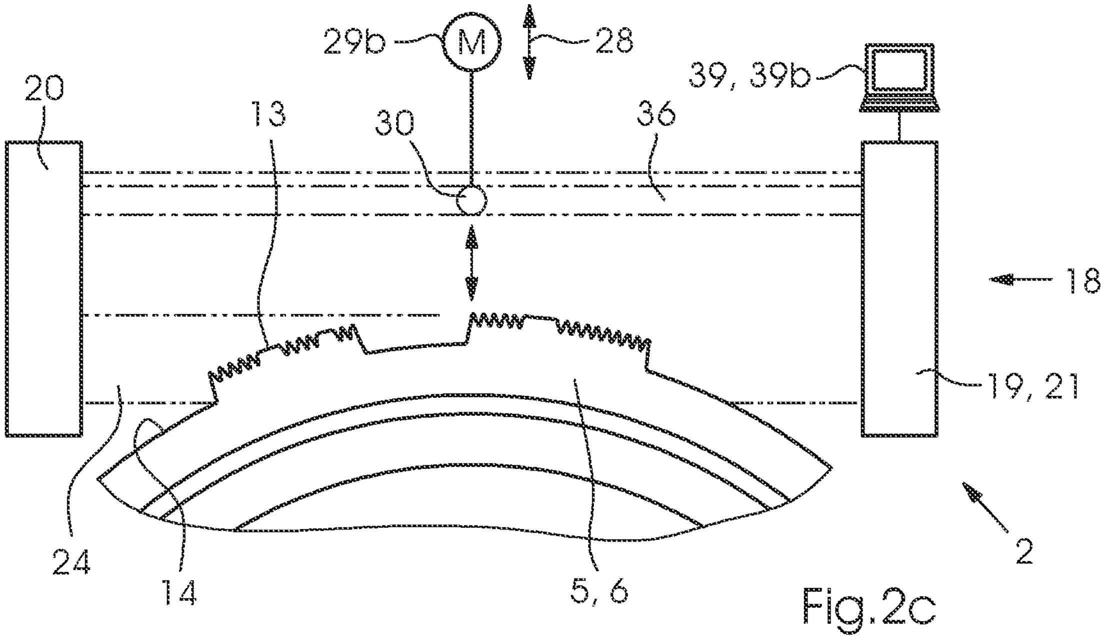

The following figures illustrate preferred embodiments of devices for taking contact-free measurements of elevations 13 on the surface 14 of a rotary body 6 embodied as a flexographic printing forme of the printing press (cf. FIG. 2C). The elevations may be flexographic printing dots (in the halftone) or flexographic printing surfaces (in a solid area) of a flexographic printing plate. The following exemplary embodiments describe the process of taking measurements on a printing plate 5. Taking measurements on the printing plate allows an automated presetting of the respective optimum operating pressure between the cylinders involved in the printing operation, e.g. the anilox cylinder 15, the printing cylinder 16 with the printing plate 5, and the impression cylinder 17.

Figure 2B:
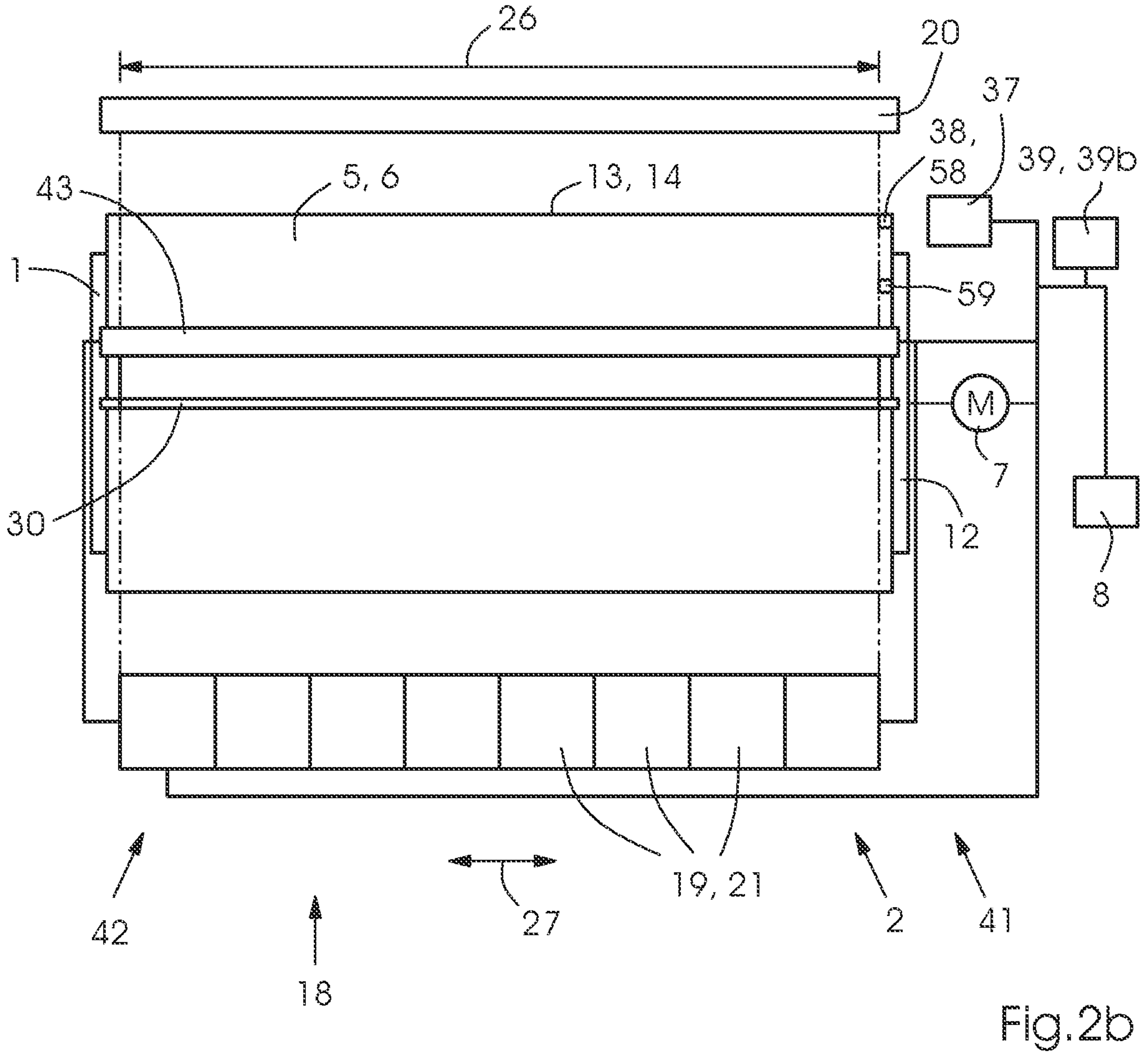

FIGS. 2A to 2C illustrate a preferred embodiment of the device for measuring the topography of a printing plate 5; FIG. 2A is a cross-sectional view, FIG. 2B is a top view, and FIG. 2C is an enlarged section of FIG. 2A. In accordance with this embodiment, the topography is preferably measured by multiple devices 18 in the course of a 3D radius detection with an optional reference line.

In this and the following embodiments, 2D is understood to indicate that a section of the printing plate 5 (for instance an annular height profile) is scanned and 3D is understood to indicate that the entire printing plate 5 (for instance a cylindrical height profile composed of annular height profiles) is scanned.

The device includes multiple radiation sources 19, in particular light sources 19, preferably LED light sources, at least one reflector 20 such as a mirror, and at least one optical receiver 21, preferably an area scan camera and in particular a high-speed camera. The following paragraphs assume that the radiation sources are light sources, i.e. visible light is emitted. Alternatively, the radiation source may emit different electromagnetic radiation such as infrared radiation. The light sources are preferably disposed in a row perpendicular to the axis of rotation 22 of the carrier cylinder 1 and generate a light curtain 23 while the carrier cylinder 1 with the sleeve 3 and the printing plate 5, i.e. the contour, generate a shading 24. The reflected and subsequently received light 25, i.e. substantially the emitted light 23 without the light 24 shaded off by the topography 13, carries information on the topography 13 to be measured. The reflector 20 may be a reflecting foil.

The light source 19 is two-dimensional. The light source preferably emits visible light. The light sources 19 and the optical receivers 21 preferably cover the working width 26, i.e. the extension of the printing plate 5 in the direction of its axis 22 (for instance 1650 mm). Preferably, n light sources 19 and receivers 21 may be provided, with 2>n>69, for example. When smaller cameras are used, an upper limit greater than 69 may be necessary. If the entire working width 26 is covered, the printing plate 5 may be measured during one revolution of the carrier cylinder 1. Otherwise the light sources and optical receivers would have to be moved, for instance in a clocked way, in an axial direction 27 along the printing plate.

The preferred cameras for use in the process are inexpensive but fast cameras 21 such as black-and-white cameras. The cameras may record individual images or a film during the rotation of the printing plate 5.

The device made up of the light sources 19, reflector 20, and optical receiver 21 may preferably only be moved in a direction 28 perpendicular to the axis 22 of the carrier cylinder 1 to direct the generated strip of light 23 to the topography 13 to be measured. For this purpose, a motor 29 may be provided. Alternatively, the reflector may be stationary and only the light source and/or the optical receiver may be moved, for example by using a motor.

In contrast to the representation, the measuring operation of the topography 13 is preferably occurs in a perpendicular direction (e.g. camera at the bottom and reflector at the top) and not in a horizontal direction because in this case, any potential bending of the carrier cylinder 1 and reference object 30 may be ignored. For this preferred solution, one needs to imagine FIG. 2*a* rotated through a 90° angle in a clockwise direction.

As an optional reference object 30, a line-shaped object 30 is provided; the line-like object 30 is preferably a tautened thread 30 or a tautened piece of string 30, for instance a metal wire or a carbon fiber or a blade (or a blade-like object or an object with a cutting edge) or a bar, which creates a line 31 of reference for the plurality of optical receivers 21. The line-shaped object preferably extends in a direction parallel to the axis of the carrier cylinder 1 and is preferably disposed a short distance 32, for instance 2 mm to 10 mm (20 mm at the maximum) away from the circumferential surface 33/the printing plate 5 disposed thereon. The received light 25 further includes information that may be analyzed on the reference object 30 such as its location and/or distance from the surface 14 of the printing plate 5 (the surface being preferably etched and therefore on a lower level than the elevations 13). The reference line may be used to determine the radial distance R of the topography 13/contour or the contour's elevations from the reference object 30, preferably by using digital image processing. The distance between the reference object 30 and the axis 22 of the carrier cylinder 1 is known due to the configuration and/or a motorized adjustment of the reference object 30 (optionally together with the light source 19 and the optical receiver 21 and the reflector 20 if provided). Thus the radial distance of the contour elevations, i.e. the radius R of the print dots, may be determined by computation. Due to the use of the reference object 30 and the presence of shades created by it/of a reference line 31 corresponding to the shade (in the recorded image/from the received light) of every camera 21 a precise, of the cameras relative to one another is not strictly necessary. Moreover, the reference object 30 may be used to calibrate the measuring system.

For the purpose of movement/adjustment in a direction 28 the reference object 30 may be coupled to the light source 19 and/or to the motor 29. Alternatively, the reference object may have its own motor 29*b* for movement/adjustment purposes.

For an initial referencing of the device, a measurement preferably is taken on an ("empty") carrier cylinder or on a measuring sleeve disposed thereon (measuring the distance between the reference object and the surface from DS to OS).

For a further initialization of the device before the measuring operation, a first step preferably is to move the area scan camera 21 towards the carrier cylinder 1. The movement is preferably stopped as soon as the camera detects preferably the first elevation. Then the reference object 30 is preferably likewise moved in direction 28 until a predefined distance, e.g. 2 mm from the carrier cylinder 1 is reached.

The light source 19 and optical receiver 21 may alternatively be disposed on opposite sides of the carrier cylinder 1; in such a case no reflector 20 is required.

The light source 19, the reflector 20 (if it is present in the embodiment), the optical receiver 21 and the optional reference object 30 form a unit 34, which is movable (in a direction perpendicular to the axis 22 of the carrier cylinder), in particular adjustable or slidable by a motor.

During the measuring operation, the carrier cylinder 1 and the printing plate 5 located thereon rotate to ensure that preferably all elevations 13 may be scanned in the circumferential direction 35. Based thereon, a topographic image and the radius R of individual elevations 13, e.g. flexographic printing dots, from the axis 22 or the diameter D (measured between opposite elevations) may be determined as a function of the angular position of the carrier cylinder 1.

In the enlarged view of FIG. 2C, a section of the topography 13 of the printing plate 5 as well as the shading 24 of the topography and the shading 36 of the reference object 30 are visible. The topographic elevations 13 may be in a range between 2 μm and 20 mm.

A sensor 37 for identifying the sleeve 3 and/or the printing plate 5 based on an identification feature 38 may be provided (cf. FIG. 2B). This feature may, for instance, be a bar code, a 2D code such as a QR code or a data matrix code, a RFID tag, or a NFC tag.

The signals and/or data generated by the light receivers 21 and including information on the topography 13 of the measured surface 14 and on the reference object 30 are transmitted to a computer 39 to be processed, preferably through a wire or a wireless connection. The computer is connected to the printing press 8. The computer 39 analyzes the information.

Before the measurement, the reference object 30 may be moved into the reception range of the optical receiver 21 to calibrate the optical receiver. The optical receiver 21 detects and transmits the generated signals of the calibration to the computer 39. The calibration data are saved in the digital memory 40 of the computer 39.

This provides a way of saving a virtual reference object on the computer 39. Subsequently the reference object 30 is removed from the range of the optical receiver 21 and the topography 39 of the surface 14 to be measured is processed together with the virtual reference object.

The result of the analysis is saved in a digital memory 40 of the computer, in a digital memory 40 of the printing press, or in a cloud-based memory. The saved results are preferably saved in association with the respective identification mark 38. When the sleeve-mounted printing plate 5 (or sleeve/flexographic printing forme) is used in the printing press 8 at a later point, the identification feature 38 of the printing plate 5/flexographic printing forme (or sleeve) may be scanned again to access the values associated with the identification mark 38, for instance for presetting purposes. For instance, the printing press may receive the data required for a print job from the cloud-based memory.

The result of the analysis may preferably include up to four values: The printing pressure adjustments on the two sides 41/DS (drive side) and 42/OS (operator side) between the printing cylinder 16, i.e. the cylinder carrying the measured printing plate 5, and the impression cylinder 17 or printing substrate transport cylinder 17, and the printing pressure adjustments between an anilox roller 15 for inking the measured printing plate 5 and the printing cylinder 16 as they are required during operation.

In addition, a device 43 for determining dot density, for instance by optical scanning, may be provided, preferably a CIS (contact image sensor) scan bar, a line scan camera, or a laser triangulation device. Alternatively, the device 43 may be a mirror which may pivot or be movable in a way for it to be usable together with the light sources 19, 21 to measure dot density. The device is preferably connected to a device for image processing and/or image analysis, which is preferably identical with the computer 39, i.e. the computer 39 programmed in a corresponding way, or which may be a further computer 39*b*.

A CIS scan bar may be disposed to be axially parallel with the cylinder. It preferably includes LED for illumination and sensors for recording images (similar to a scan bar in a commercial copying machine). The bar is preferably disposed at a distance of 1 to 2 cm from the surface or is positioned at this distance. The cylinder with the surface to be measured, e.g. the printing plate, rotates underneath the bar, which generates an image of the surface in the process to make it available for image analysis to determine dot density. The data obtained from the dot density determination process may additionally be used, for instance, computationally to select or recommend the best anilox roller from among a plurality of available anilox rollers for the printing operation with the recorded printing forme.

Figure 3A:
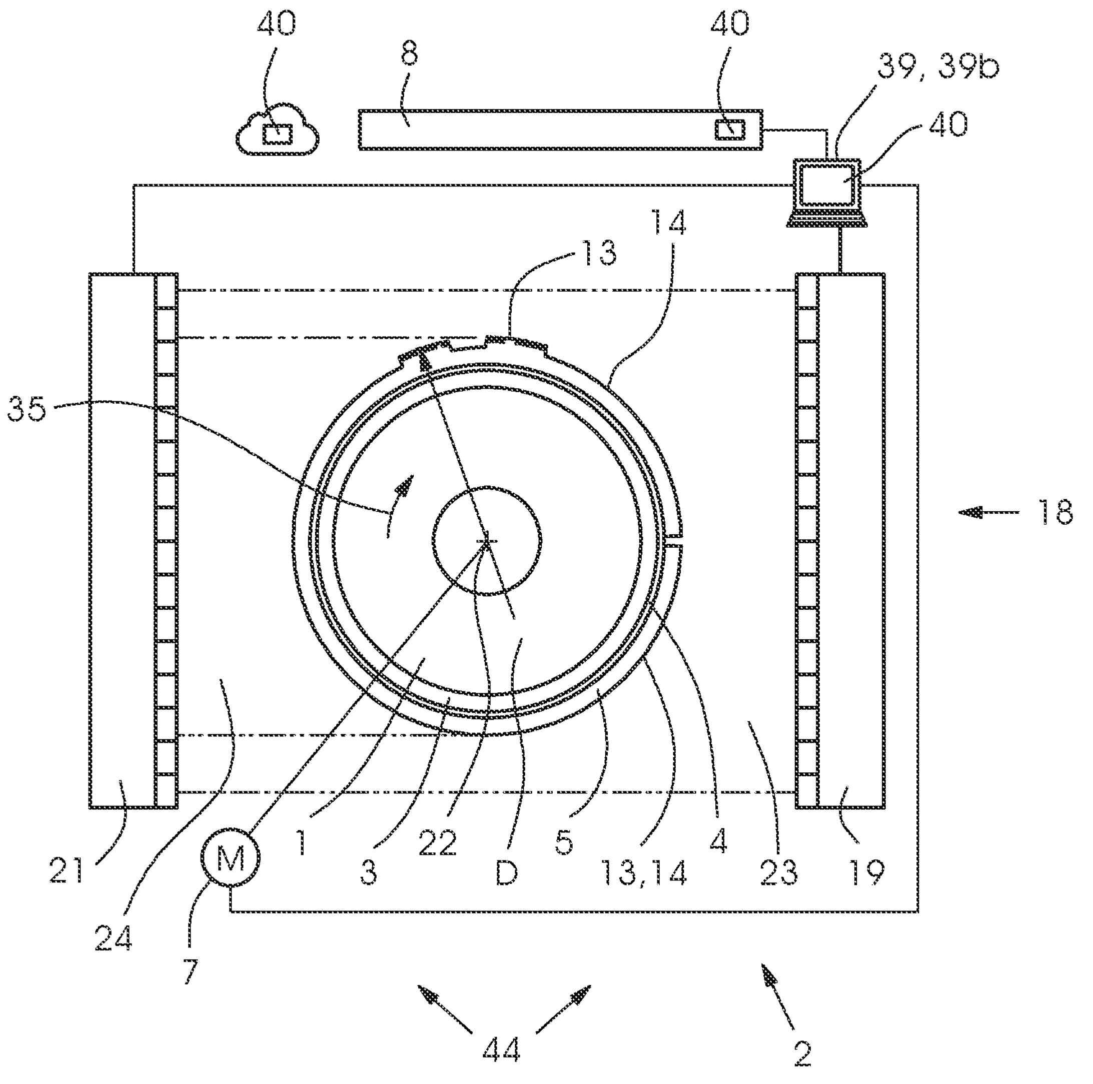
Figure 3B:
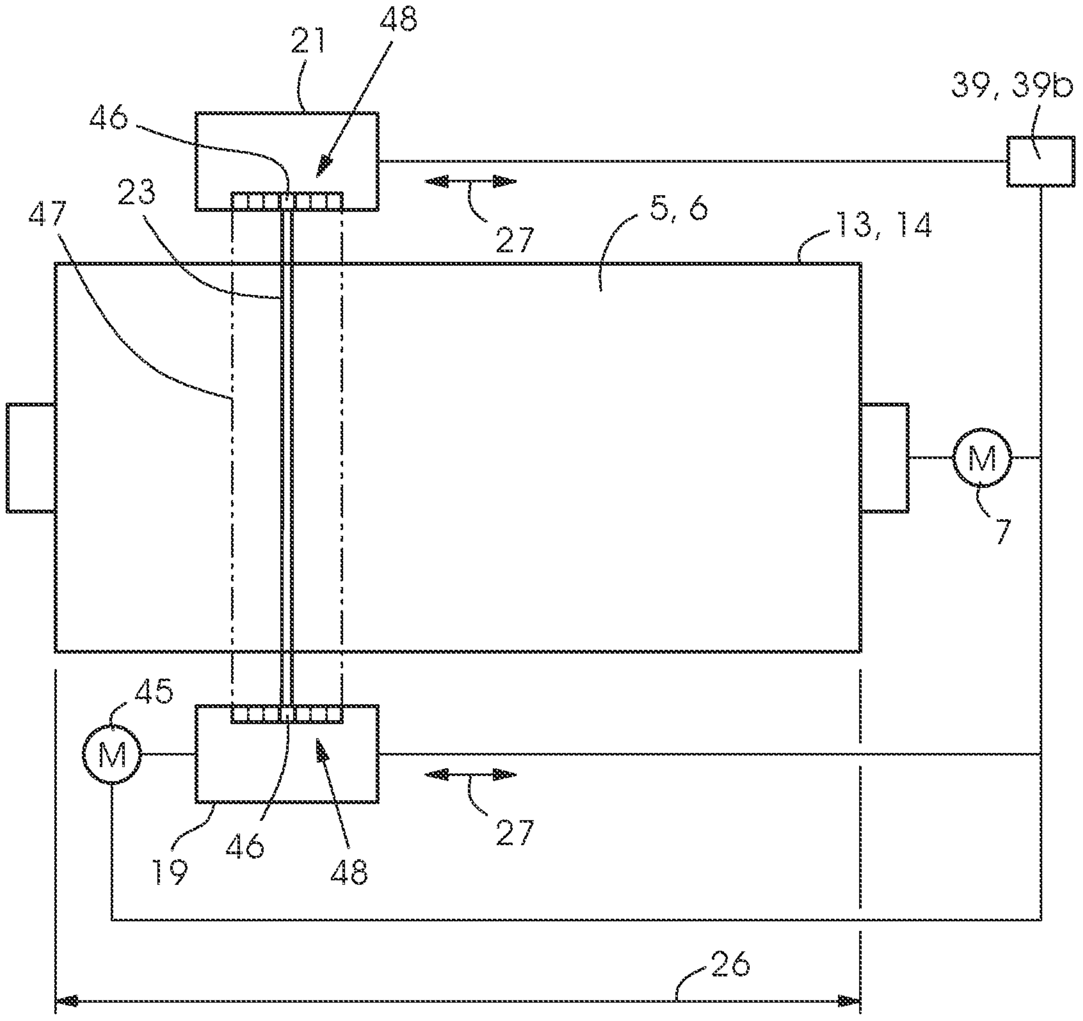

FIGS. 3A and 3B illustrate preferred embodiments of the device for measuring the topography of a printing plate 5; FIG. 3A is a cross-sectional view and FIG. 3B is a top view. In accordance with this embodiment, the topography is preferably scanned by a laser micrometer 44 in the course of a 2D diameter determination process.

The device includes a light source 19, preferably a line-shaped LED light source 19 or a line-shaped laser 19, and an optical receiver 21, preferably a line scan camera 21. Together, the laser and optical receiver form a laser micrometer 44. The light source 19 generates a light curtain 23 and the carrier cylinder 1 with the sleeve 3 and the printing plate 5 creates a shading 24. The line lengths of the light source 19 and the optical receiver 21 are preferably greater than the diameter D of the carrier cylinder including the sleeve and printing plate to allow the topography to be measured without any movement of the device 44 perpendicular to the axis 22 of the carrier cylinder. In other words, the cross section of the carrier cylinder is completely within the light curtain.

The device 44 including the light source 19 and the optical receiver 21 may be moved in a direction parallel to the axis 22 of the carrier cylinder (in direction 27) to record the entire working width 26. For this purpose, a motor 45 may be provided.

A sensor 37 for identifying the sleeve 3 and/or the printing plate 5 based on an identification feature 38 may be provided (cf. FIG. 2B).

The signals and/or data generated by the optical receivers 21 are transmitted, preferably through a wire or a wireless connection, to a computer 39, where they are processed. The computer is connected to the printing press 8.

The light source 19 and optical receiver 21 may alternatively be disposed on the same side of the carrier cylinder 1; if this is the case, a reflector 20 is disposed on the opposite side in a way similar to the one shown FIGS. 2A and 2C.

In accordance with an alternative embodiment, the topography is preferably recorded using a laser micrometer 44 in the course of a 2D diameter determination process, which does not only record an individual measuring row 46, but a wider measuring strip 47 (illustrated in dashed lines) formed of multiple measuring rows 48 (illustrated in dashed lines). In this exemplary embodiment, the light source 19 and the optical receiver 21 are preferably two-dimensional and not just line-shaped. The light source 19 may include multiple light rows 48 of a width of approximately 0.1 mm and at a distance of approximately 5 mm from one another. In this example, the camera is preferably an area scan camera.

Figure 4A:
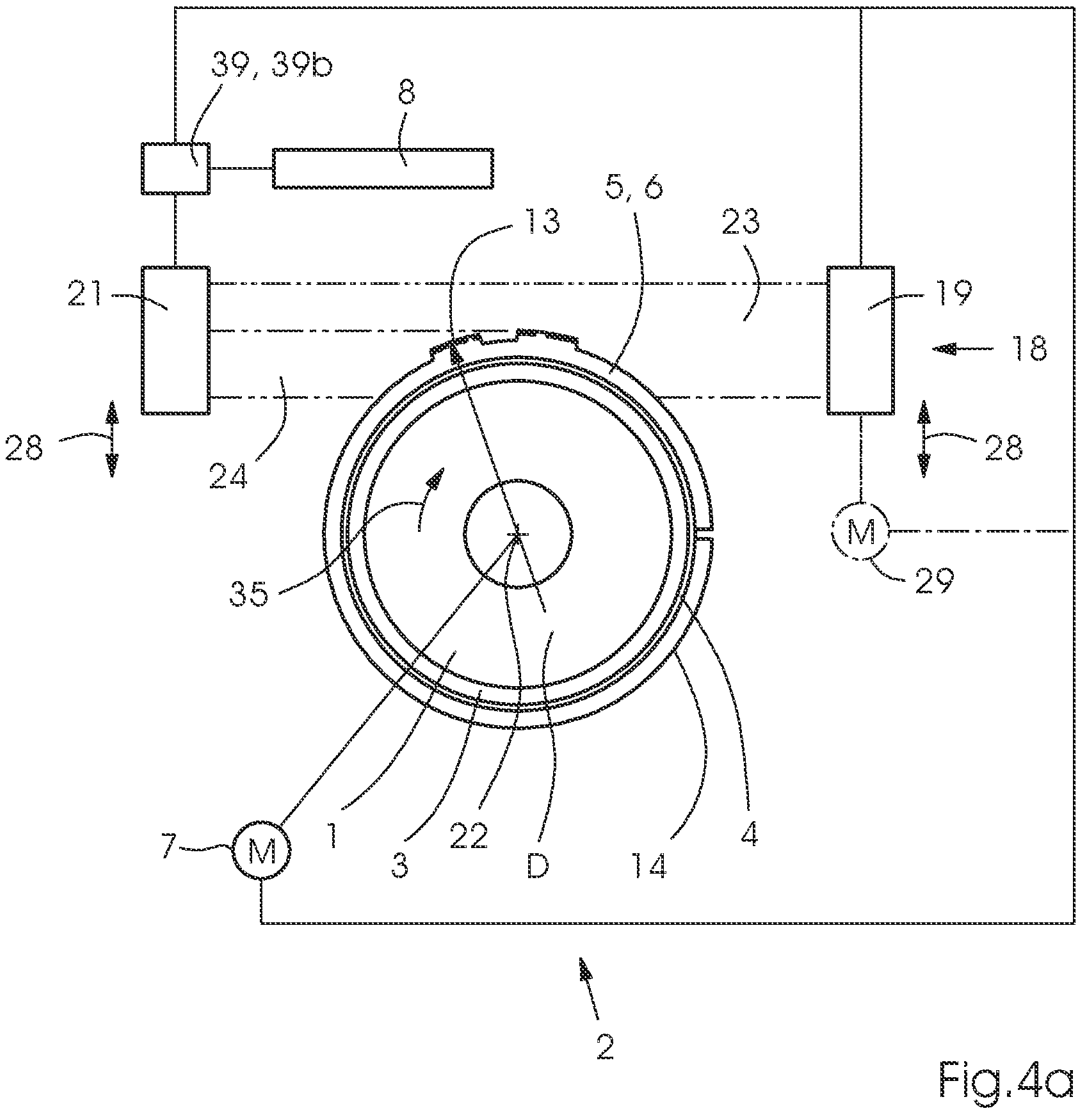
Figure 4B:
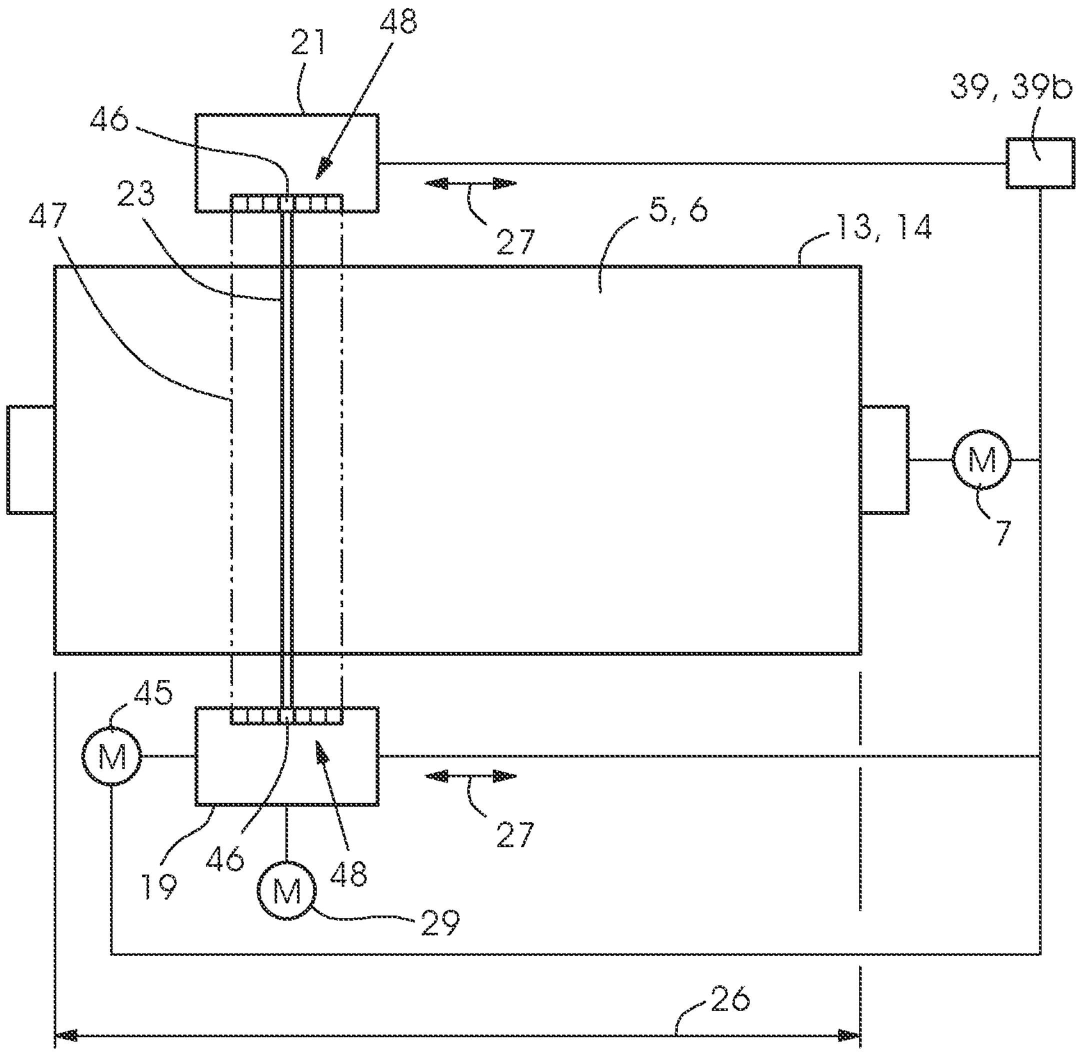

FIGS. 4A and 4B illustrate a preferred embodiment of the device for measuring the topography of a printing plate 5; FIG. 4 is a cross-sectional view and FIG. 4 is a top view. In accordance with this embodiment, the topography is preferably scanned by a laser micrometer in the course of a 2D diameter determination process.

The device includes a light source 19, preferably an LED light source 19, and a light receiver 21, preferably a line-shaped LED light source 21 or a line-shaped laser 21. The light source 19 generates a light curtain 23 and the carrier cylinder 1 with the sleeve 3 and the printing plate 5 creates a shading 24.

The device made up of the light source 19 and optical receiver 21 may preferably be moved in a direction 28 perpendicular to the axis 22 of the carrier cylinder 1 to direct the light curtain 23 to the topography 13 to be measured. For this purpose, a motor 29 may be provided. In a case in which the light curtain 23 is wide enough to cover the entire measuring area, the motor 29 is not necessary.

The signals and/or data generated by the optical receivers 21 are transmitted for further processing, preferably by wire or wireless connection, to a computer 39. The computer is connected to the printing press 8. The light source 19 and the optical receiver 21 may alternatively be disposed on the same side of the carrier cylinder; if this is the case, a reflector 20 is disposed on the opposite side in a way similar to the one shown FIGS. 2A and 2C.

In accordance with an alternative embodiment, the topography 13 is preferably scanned using a laser micrometer 44 in the course of a 3D diameter determination process, which does not only record one measuring row 46, but a wider measuring strip 47 (illustrated in dashed lines), i.e. multiple measuring rows 48 at the same time. In this embodiment, the light source 19 and the optical receiver 21 are two-dimensional and not just line-shaped.

In accordance with a further alternative embodiment, the topography 13 is preferably scanned using a laser micrometer 44 in the course of a 3D diameter determination process, in which the device including the light source 19 and the optical receiver 21 may preferably be moved in a direction 28 perpendicular to the axis of the carrier cylinder 1 to direct the light curtain 23 to the topography 13 to be measured. For this purpose, a motor 29 (illustrated in dashed lines) may be provided.

In accordance with an alternative embodiment, the topography 13 is preferably scanned using a laser micrometer 44 in the course of a 3D radius determination process, in which the two latter alternative embodiments are combined.

Figure 5:
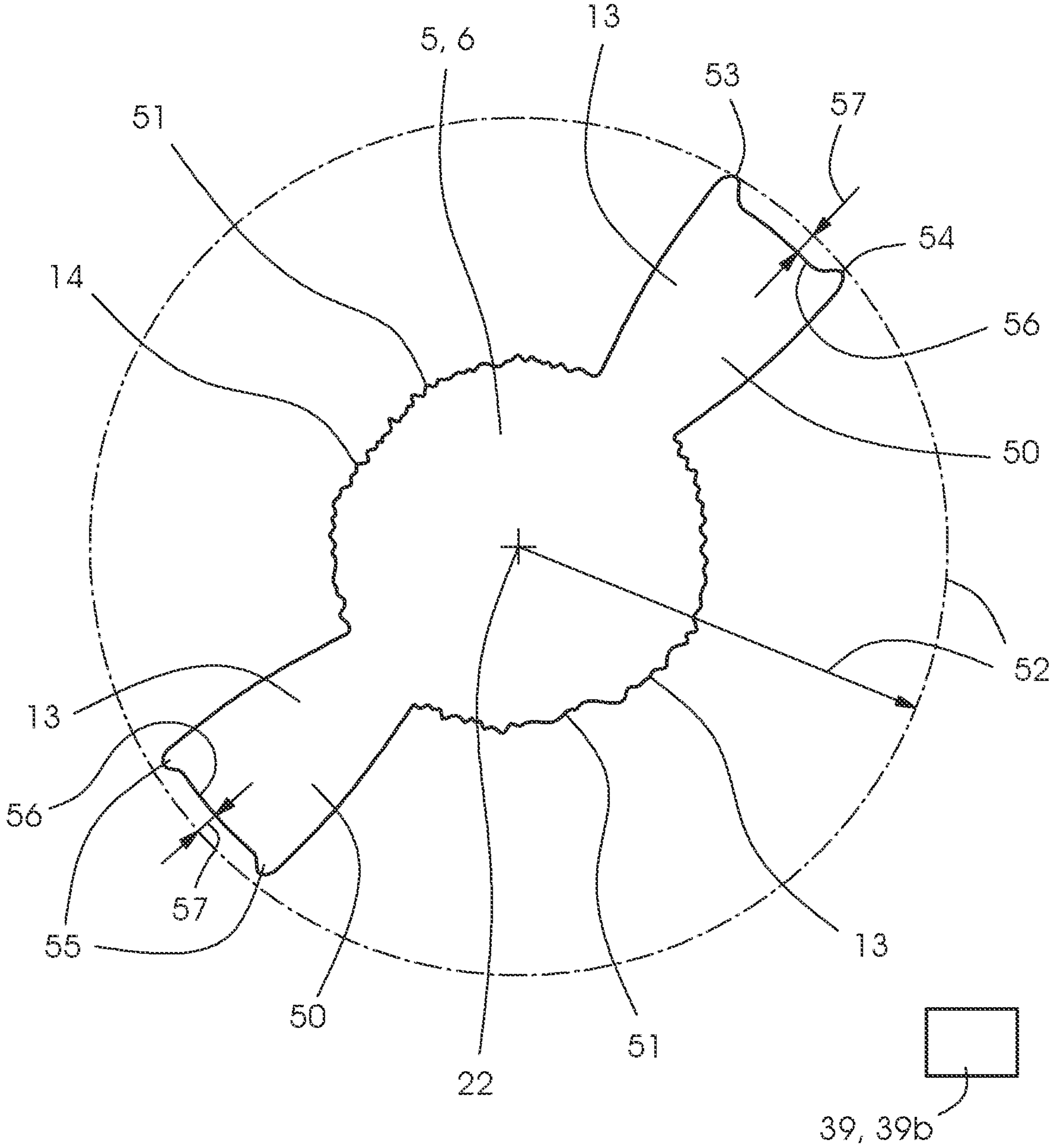

FIG. 5 is a greatly enlarged representation of an example of a topography measurement result of a printing plate 5 (flexographic printing forme) with two printing areas 50 and two non-printing areas 51. The radial measurement results for 360° at an axial location (relative to the axis of the carrier cylinder) are shown. The non-printing areas may for instance have been created by etching and thus have a smaller radius than the printing areas.

In the drawing, an enveloping radius 52/an envelope 52 of the dots with the greatest radius on the printing plate 5, i.e. of the highest elevations of the topography 13 at the axial location is shown.

A dot 53 on the printing plate 5 is a printing dot because during a printing operation at a normal pressure/print engagement between the printing plate 5 and the printing substrate 11/transport cylinder 17 this dot would have sufficient contact with the printing substrate and the ink-transferring anilox roller. A normal pressure setting creates a so-called kissprint, which means that the printing plate just barely touches the printing substrate and that the flexographic printing dots are not compressed to any greater extent.

A dot 54 is a dot which would only just print at a normal pressure setting during a printing operation because it would only just be in contact with the printing substrate.

Two dots 55 are dots which would not print because at regular pressure during a printing operation they would not be in contact with the printing substrate nor with the anilox roller.

A computer program which computationally identifies the radially lowest point 56 in the printing area 50 and its radial distance 57 to the envelope 52, for instance by using digital image processing, runs on the computer 39. This computation is made at regular intervals along the axial direction, for instance from DS to OS at all measuring points to find the respective maximum of the lowest points (i.e. the absolutely lowest value) from the DS to the center and from the center to the OS. The two maximums or the adjustment values computationally obtained therefrom may for instance be selected as the respective printing pressure adjustment values/setting for DS and OS during the printing operation, i.e. the cylinder distance between the cylinders involved in the printing operation is reduced by the setting on DS and OS. A motor-driven threaded spindle may be used on DS and OS for this purpose.

The following is a tangible numerical example:

On one side, the resultant distance is deltaR=65 μm and on the other side the resultant distance is deltaR=55 μm. For all dots 53 to 55 on the printing plate to print, 65 μm need to be set.

In all of the illustrated embodiments and the alternatives that have been given, the runout resulting from the manufacturing process and/or from the use of the sleeve 3 (due to wear) may be measured and may be factored in during the printing operation on the basis of the measurement and analysis results to improve the quality of the printed products. When a predefined runout tolerance is exceeded, an alarm may be output. The measurement may be taken on smooth and porous sleeves.

In accordance with the invention, radar emitters 19 (in combination with suitably adapted receivers) may be used instead of the light sources 19 or light emitters 19 (which emit visible light).

In all of the illustrated embodiments and the alternatives that have been given, parameters for a dynamic pressure adjustment may be determined and passed on to the printing press. In this process, a delayed expansion of the deformable and/or compressible print dots 53 to 55 made of a polymeric material may be known (for instance pre-measured) and made available to the computer 39 to be factored in. Or a hardness of the printing plate which has been pre-measured using a durometer may be used. The expansion may in particular be a function of the printing speed during operation, i.e. this dependency on the printing speed may be factored in. For instance at higher printing speeds, a higher printing pressure setting may be chosen.

What may likewise be factored in (as an alternative or in addition to the printing speed) is the printing surface of the printing plate 5 or the dot density, i.e. the density of the printing dots on the printing plate 5, which may vary from location to location. For instance, at higher dot densities, a higher printing pressure setting may be chosen and/or the dot density may be used to set up dynamic printing pressure adjustment.

The received light 25, i.e. substantially the emitted light 23 minus the light 24 shaded off by the topography 13, may be used to determine the local dot density. It carries information about the topography 13 to be measured and/or about the surface dot density and/or on the elevations thereof.

A device 43 for determining/measuring dot density, i.e. the local values thereof, on the printing forme, for instance a flexographic printing forme, may be provided, preferably in the form of a CIS scan bar or a line scan camera. For instance, on the basis of the data that has been obtained/calculated in the dot density determination process, specification values for different printing pressure settings on DS (drive side of the printing press) and OS (operator side of the printing press) may be provided.

If the dot density of the printing plate 5 and/or of an anilox roller 15 for ink application and/or of an anilox sleeve 15 is known, the expected ink consumption of the printing operation using the printing plate on a given printing substrate 11 may be determined by computation. The ink consumption may then be used to compute the required drying power of the dryers 10 to dry the ink on the printing substrate. The expected ink consumption hat has been calculated may also be used to calculate the amount of ink that needs to be provided.

In all of the illustrated embodiments and the alternatives that have been given, a so-called cylinder bounce pattern may also be factored in. A cylinder bounce pattern is a disturbance that periodically occurs as the printing plate 5 rotates. It is caused by a page-wide or at least detrimentally wide gap or channel usually extending in an axial direction in the printed image, i.e. a detrimentally large area without printing dots, or any other type of axial gap. Such gaps or the cylinder bounce pattern they cause may affect the quality of the prints because due to the kissprint setting, the cylinders involved in the printing operation rhythmically get closer and separate again as the channel region returns during rotation. In an unfavorable case, this may result in undesired density fluctuation or in even print disruptions. An existing cylinder bounce pattern may preferably be detected by using a CIS measuring device 43 (e.g. the aforementioned pivoting or movable mirror together with the area scan cameras) or by using an area scan camera. Then it may be computationally analyzed and compensated for when the operationally required printing pressure is set. On the basis of the detected cylinder bounce pattern, for instance, the speeds or rotary frequencies at which vibration would occur in a printing press may be calculated in advance. These speeds or rotary frequencies will then be avoided during production and passed over in the process of starting up the machine.

Every printing plate 5 may have its own cylinder bounce pattern. Gaps in the printing forme may have a negative influence on the print results or may even cause print disruptions. In order to reduce or even eliminate the bouncing of cylinders, the printing plate is checked for gaps in the roll-off direction. If there are known resonance frequencies of the printing unit 9, production speeds that are particularly unfavorable for a given printing forme may be calculated. These printing speeds need to be avoided as “no go speeds.”

In all of the illustrated embodiments and the alternatives that have been given, register marks (or multiple register marks such as wedges, double wedges, dots, or cross hairs) on the printing forme may be detected, for instance by using the camera 21 or 43 and a downstream digital image processor, and their positions may be measured, saved, and made available. Thus register controllers or the register sensors thereof may automatically be adapted to register marks or axial positions. Thus errors which may otherwise be caused by manual adjustments of the sensors may advantageously be avoided.

Alternatively, patterns may be detected and used to configure a register controller.

For an automated configuration/adjustment of the control unit of the register controller, a camera (400, 21, 43) is used to subject an image (410) of a flexographic printing forme (301) to digital image processing, for instance by using a computer (401), localizing at least one register mark (310, 311) in terms of its x and y positions.

These localized x/y data of the register mark may be saved in a digital memory 317 in association with an ID/an identifier 316 of the sleeve and may be made available to the flexographic printing press/to the flexographic printing unit when the sleeve is used and the ID is called up.

On the basis of the register mark position data (x-y localization), the flexographic printing press/the flexographic printing unit carries out the setting of the control unit of the register controller. The setting of the register control is understood to include the configuration of the register marks of a print job, for instance.

A print job usually involves operating multiple printing units which apply inks or varnishes and each of which is equipped with one flexographic printing forme (301).

The position data (x-y localization) of the print marks (310, 311) for two flexographic printing formes, for example, may be different.

For this purpose, the register control unit of the printing machine receives the position data (x-y localization) of the print mark (310, 311) for every utilized flexographic printing forme (301) with the identifier (316), which means that the configuration of the register marks of the print job may be composed of multiple flexographic printing formes (301).

An advantageous method of configuring the register controller includes the steps of recording an image (410) of the surface of the sleeve with the at least one flexographic printing forme by using a camera (400) and subjecting the image to image processing to localize at least one register mark (310) in terms of its x/y position; and, based thereon, automating the adjustment of the register controller for recording register marks.

It is also possible to automatically position a register sensor which is movable by a motor, in particular in an axial direction. It is also possible to compare a predefined zero point of the angular position of a printing cylinder and/or of a sleeve disposed thereon to an angular value of the actual location of a printed image (which has for example been glued on by hand), in particular in the circumferential direction (i.e. of the cylinder/sleeve). This comparison may be used to obtain an optimum starting value for the angular position of the cylinder/sleeve. In this way, register deviations may be reduced at the start of the production run. The same is true for the lateral direction (of the cylinder/sleeve).

In all of the illustrated embodiments and the alternatives that have been given, the power of the dryer 10 of the printing press 8 may likewise be controlled (potentially in a closed control loop). For instance, LED dryer segments may be switched off in areas in which no printing ink has been applied to the printing substrate, thus advantageously saving energy and prolonging the useful life of the LED.

In accordance with another advantageous feature, the power of the dryer 10 or of individual segments of the dryer may be reduced for areas on the printing plate which have a low dot density. This may save energy and/or prolong the useful life of a dryer or of individual segments. The stopping or reduction may occur in specific areas on the one hand and in a direction parallel to and/or transverse to the axial direction of a printing plate and to the lateral direction of the printing substrate to be processed by it. For instance, segments or modules of a dryer may be switched off in areas which correspond to gaps between printing plates (for instance printing plates which are spaced apart from one another, especially ones that have been glued on by hand).

In all of the illustrated embodiments and the alternatives that have been given, the respective location (on the printing plate 5) of measuring fields for print inspection systems may be detected and made available for further uses such as a location adjustment of the print inspection systems.

An inline color measuring system may be positioned in all of the illustrated embodiments and the alternatives that have been given. In order to determine the location and thus the position of the inline color measurement, an image and/or pattern recognition process is implemented to find the axial position for the measuring system. In order to provide a free space for calibration to the printing substrate, the inline color measurement system may be informed of unprinted areas.

The following section is an example of an entire process which may be carried out by a suitable embodiment of the device.

Measuring Process:

Step 1: Sleeve 3 with or without a printing plate 5 is slid onto the carrier cylinder 1 of the measuring station 2 on the air cushion and is then locked on the carrier cylinder 1.

Step 2: The sleeve is identified by a unique chain of signs 38, which may be a bar code, a 2D code (such as a QR code or a data matrix code), an RFID tag, or an NFC tag.

Step 3: Camera 21 and optionally the reference object 30 are positioned in accordance with the diameter (of the sleeve with or without the printing plate).

Step 4: The topography 13 of the printing plate, i.e. the radii of the elevations/print dots 53 to 55, is determined with the axis 6 or rather the axial center of the carrier cylinder 22 as the point of reference. In this process, the light source 19 and the camera 21 of the measuring device 18 may move in an axial direction and the carrier cylinder rotates (its angular position is known through an encoder).

Step 5: An area scan is made to detect dot densities, non-printing areas, printing areas, register marks, and/or measuring fields for inline color measurements.

Step 6: A topography algorithm running on a computer 39 is applied and the areas are analyzed through the area scan, including the detection of cylinder bounce patterns and the structure of register mark fields/inline color measurements.

Step 7: Optionally, the hardness of the plate is determined (in shore as the unit of measurement).

Step 8: A dust/hair detector is used.

Step 9: The data of the measured results are saved in a digital memory 40.

Step 10: The measured results are displayed, pointing out dust/hairs, air inclusions, and/or indicating thresholds for runout, eccentricity and/or convexity, for instance.

Step 11: The measurement may be retaken or the sleeve is removed to measure another sleeve.

Set-Up Process:

Step 1: Sleeve 3 with printing plate 5 is slid onto the printing cylinder 16 of the printing press 8 on the air cushion that has been created by applying air to the printing cylinder 16 and is then locked thereon.

Step 2: The sleeve and its unique chain of signs 38 is identified by the respecting printing unit 9, i.e. by a sensor provided therein. This may be done by bar code, 2D code (such as a QR code or data matrix), RFID tag, or NFC tag.

Step 3: The printing unit/printing press accesses the saved data associated with the identified sleeve/printing plate.

Adjustment Process:

Step 1: The so-called kissprint setting (adjustment of the engagement/operating pressure) is set for the printing cylinder 16 and the screen cylinder 15, for instance based on the topography, runout, and printing substrate data, to achieve the optimum print setting. The diameter/radius are determined. The diameter/radius are known from the measurement.

Step 2: The pre-register is calculated on the basis of the register mark data on the printing plate or of a point of reference on the sleeve.

Step 3: The dynamic printing pressure adjustment is set on the basis of the determined dot density values, the printed area, the printing speed, and optionally of the printing substrate. Optionally, the hardness of the plate is factored in (in Shore as the unit of measurement).

Step 3: The optimum speed for the web of material is set, for instance on the basis of the calculation of the determined resonance frequencies of the printing unit for the printing plate by detecting the cylinder bounce pattern.

Step 5: The optimum drying power (UV or hot air) is set on the basis of the dot density values and the printed area as well as on the basis of anilox cylinder data (such as pick-up volume), and is optionally dynamically adapted to the speed of the web of material.

Step 6: The ink consumption is calculated on the basis of the dot density values and the printed area as well as on the basis of anilox cylinder data (such as pick-up volume).

Step 7: LED-UV dryer sections in places where the plate has a low dot density or where no drying is needed are reduced or switched off to save energy and increase the useful life of the LEDs.

Step 8: The register controller is set in a fully automated way on the basis of the obtained register mark data, for instance the mark configuration and the automated positioning of the register sensor.

Step 9: The measuring position for spectral inline measurement and print inspection of the printed inks is set, information on the location/the measuring position is provided.

Figure 6:
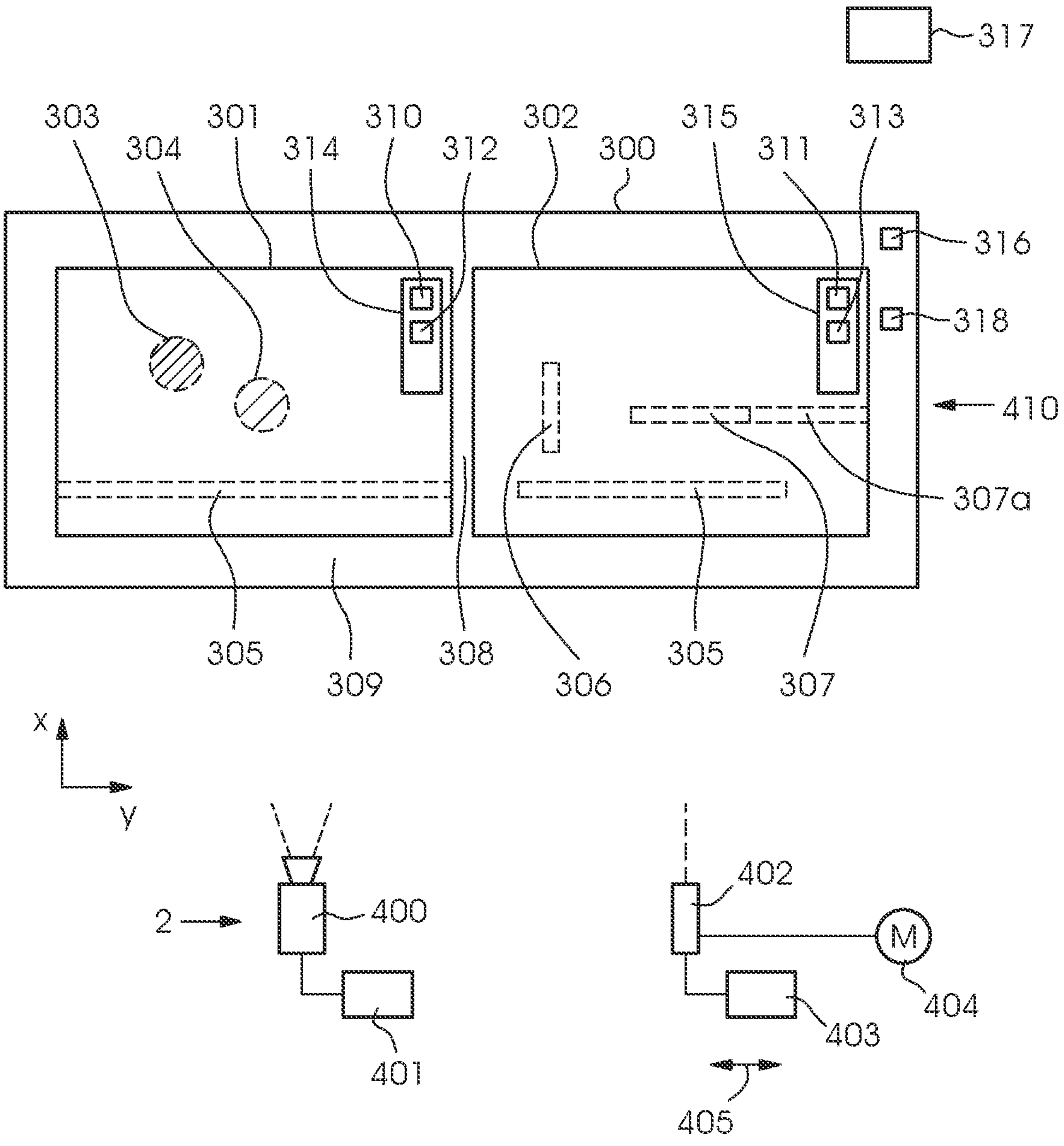
FIG. 6 is an elevational view of an example of a recorded image on a sleeve carrying two flexographic printing formes.

FIG. 6 illustrates a recorded image 410 of a sleeve 300 and of two flexographic printing formes 301 and 302 shown as an example. The image has preferably been recorded/generated by a camera 400, in particular in a measuring station 2. The image may be transmitted to a computer 401. This computer may be the computer 39 shown in FIG. 2A. The image may be subjected to computational image processing to obtain information/data. These data may be saved in a digital memory 317 in association with an ID/an identifier 316 on the sleeve and may be made available to the flexographic printing press when the sleeve is used and the ID is called up.

The figure illustrates an example of a recorded area 303 of a high dot density and a recorded area 304 of a low dot density. The areas may be detected and separated by an image processing system and may preferably be color-coded. The knowledge of the local dot densities of the entire flexographic printing forme 301 (and of the further flexographic printing forme 302) may be used to computationally determine a presetting for the so-called printing engagement, i.e. a setting of the contact pressure between the flexographic printing cylinder and the impression cylinder (and/or the anilox roller) when the sleeve is in use.

The figure also shows an example of a detected gap 305. In the region of the gap 305 there are no (or hardly any) printing elevations on the flexographic printing forme 301. The gap 305 primarily extends in an axial y direction and has an axial length in a direction y (and a width in a direction x)

that makes it critical in terms of potential cylinder bouncing when the gap passes the printing nip and thus in terms of potentially detrimental vibration. Gaps 306 and 307 are two examples of gaps that are uncritical from this point of view because of their dimensions and because they are adjacent to printing areas 307*a*. The same is true for the gap 308 formed between the two flexographic printing formes 301 and 302 which are mounted at a distance from one another (e.g. glued to the sleeve 300). The gap 309 between the leading and trailing edges of the flexographic printing forme 301 however may be critical. Critical gaps are computationally detected and preferably identified as such.

The figure also shows two examples 310 and 311 of register marks as well as color measurement fields 312 and 313. In the illustrated example the marks and fields are disposed in control strips 314, 315, respectively. The marks and fields are preferably likewise recorded by the camera 400, recognized by an image processing system, and separated. Their positional data (x-y location) are saved in association with the ID 316 of the sleeve.

The figure further shows an example of a so-called error mark 318 for detecting a faulty mounting of a flexographic printing forme or of multiple flexographic printing formes on the sleeve or on multiple sleeves. Their positional data are likewise saved in association with the ID 316 of the sleeve.

FIG. 6 further illustrates a sensor 402. The sensor 402 may be a register sensor and/or a spectrometer, which is/are disposed in the flexographic printing unit of the flexographic printing press and directed towards the web of printing substrate 11. The sensor is connected to a computer 403 and may be moved in an axial direction y 405 by using a motor 404 and may thus be positioned in an automated way. Using the data generated from the image 410 and making them available to the printing press when the sleeve 300 is being used, the sensor may be positioned along the printing substrate 11 at the y position of a mark 310, 311 to be printed and recorded and/or the same sensor or a further sensor may be positioned along the printing substrate 11 in field 312, 313 for instance for color inspection by using a spectrometer. The data generated by the sensor are then forwarded to the computer 403, which may be the same as computer 401 and/or as computer 39.

The following is a summary list of reference numerals and the corresponding structure used in the above description of the invention:

1 carrier cylinder
2 measuring station
3 sleeve
3*a* ID of the sleeve
4 adhesive tape
5 printing plate/flexographic printing forme
5*a* ID of the printing plate/flexographic printing forme
6 rotary body/flexographic printing forme
7 first motor
8 printing machine/flexographic printing press
9 printing unit/flexographic printing unit
10 dryer
11 printing substrate
12 measuring rings
13 elevations/topography
14 surface
15 anilox roller/anilox cylinder
15*a* ID of the anilox roller/anilox cylinder
16 printing cylinder
17 impression cylinder/printing substrate transport cylinder
18 measuring device
19 radiation sources, in particular light sources
20 reflector/mirror
21 radiation receiver, in particular optical receiver such as cameras
22 axis of rotation
23 light curtain/emitted light
24 shading
25 reflected light
26 operating width
27 axial direction
28 direction of movement
29 second motor
29*b* further second motor
30 reference object/line-like object, in particular thread/string/blade/bar
31 line of reference
32 distance
33 circumferential surface
34 unit
35 circumferential direction
36 shading
37 sensor
38 identification mark/ID
39 digital computer
39*b* further digital computer
40 digital memory
41 drive side (DS)
42 operator side (OS)
43 device for determining dot density
44 laser micrometer
45 third motor
46 measuring row
47 measuring strip
48 multiple measuring rows
50 printing area
51 non-printing area
52 enveloping radius/envelope
53 print dot on the printing plate
54 dot just barely printing on the printing plate
55 non-printing dot on the printing plate
56 lowest point
57 radial distance
58 marking device
59 measuring field for measuring shore hardness
60 motor
61 journal
62 device for scanning the ID
300 sleeve
301 flexographic printing forme
302 further flexographic printing forme
303 area of high dot density
304 area of low dot density
305 gap
306 gap, non-printing area
307 gap, non-printing area
307*a* printing area
308 gap between flexographic printing formes
309 gap
310 register mark
311 register mark
312 color measuring field
313 color measuring field
314 control strip
315 control strip
316 ID
317 memory
318 error mark

400 camera
401 computer
402 sensor
403 computer
404 motor
405 direction of movement
410 image
R radial distance
D diameter
x direction (circumferential direction)
y direction (axial direction)

The invention claimed is:

1. A method of operating a flexographic printing press and a measuring device, the method comprising:

providing a flexographic printing press including at least one printing unit having a printing cylinder, a sleeve associated with the printing cylinder, a flexographic printing forme carried by the sleeve, and at least one sensor;

marking the sleeve with a machine-readable ID and providing the machine-readable ID as an unambiguous identifier of the respective sleeve;

providing a measuring device with a camera, the measuring device being different from the flexographic printing press;

providing a computer;

defining an x-direction as a circumferential direction of the sleeve, and defining a y-direction as a direction perpendicular to the x-direction being an axial direction of the sleeve;

recording respective images of surfaces of the sleeve in the measuring device by using the camera before a printing operation;

subjecting the respective image to pattern detection using the computer including searching for a defined pattern of a register mark to locate a total of at least two register marks in terms of x-positions and y-positions of the register marks before a printing operation and saving the x-positions and y-positions in association with the machine-readable ID;

making the machine-readable ID available to the flexographic printing press when the sleeve is mounted on one of the printing cylinders;

accessing the saved x-positions and y-positions in association with the machine-readable ID and automatically moving the sensors to the y-position of the respective register marks using respective actuating motors to record the register marks in the flexographic printing machine before a register adjustment;

using x-y position data of the respective register marks to record the register marks in the flexographic printing machine using the sensors;

adjusting the print register by controlling print register of the sleeve carrying the flexographic printing forme using the recorded register marks; and performing the printing operation using the adjusted print register.

2. The method according to claim 1, which further comprises including an entire circumferential length and a working width of the sleeve in the image.

3. The method according to claim 1, which further comprises selecting one of the register marks from recorded data to adjust the print register when multiple register marks are located on the sleeve in terms of x-y positions thereof.

4. The method according to claim 3, which further comprises using the recorded data to determine which register mark of a configuration of register marks is printed in which printing unit of a plurality of printing units of the flexographic printing press, to adjust the print register.

* * * * *